United States Patent [19]

Miyawaki et al.

[11] Patent Number: 4,832,428
[45] Date of Patent: May 23, 1989

[54] WAVEGUIDE OPTICAL SYSTEM

[75] Inventors: Mamoru Miyawaki; Uuichi Handa, both of Tokyo, Japan

[73] Assignee: Canon Kabushiki Kaisha, Tokyo, Japan

[21] Appl. No.: 110,570

[22] Filed: Oct. 15, 1987

[30] Foreign Application Priority Data

Aug. 29, 1983 [JP] Japan .................................. 58-157589

[51] Int. Cl.$^4$ .............................................. G02B 6/12
[52] U.S. Cl. .............................. 350/96.11; 350/96.13; 350/96.14
[58] Field of Search ................ 350/96.11, 96.13, 96.14

[56] References Cited

U.S. PATENT DOCUMENTS 4,425,023  1/1984  Matsumoto et al. ............. 350/96.13

OTHER PUBLICATIONS

"Low-Loss GaAs-Ga$_{1-x}$Al$_x$As double-heterostructure directional coupler" by A. Carenco, P. Sansonetti et al in Technical Digest, of the 7th Topical Meeting on Integrated and Guide-Wave Optics, Orlando Hyatt Hotel, Kissimee, Fla., Apr. 24–26, 1984.

*Primary Examiner*—William L. Sikes
*Assistant Examiner*—Robert E. Wise
*Attorney, Agent, or Firm*—Fitzpatrick, Cella, Harper & Scinto

[57] ABSTRACT

In a waveguide optical system having a light waveguide, a light coupler for receiving and directing a light beam propagated through the light waveguide to a condensing lens for condensing the light beam emerging from the light coupler into the form of a spot, the coupling length of the light coupler is set so that the shape of the spot is substantially circular, whereby the waveguide optical system is made suitable for use with a high-density recording optical head or the like.

5 Claims, 5 Drawing Sheets 4,832,428

WAVEGUIDE OPTICAL SYSTEM

This application is a continuation-in-part of application Ser. No. 642,761 filed 8/21/84, now abandoned.

BACKGROUND OF THE INVENTION

1. Field of the Invention

This invention relates to a waveguide optical system, and more particularly to a waveguide optical system suitable for use with a high-density recording optical head or the like.

2. Description of the Prior Art

A high-density recording optical head utilizing a waveguide optical system is proposed in U.S. Pat. No. 4,425,023, etc. An example of such optical head is shown in FIG. 1(A) of the accompanying drawings. In FIG. 1(A), reference numeral 1 designates a substrate, reference numeral 2 denotes a light waveguide, reference numerals 3 and 4 designate prism light couplers, reference numeral 5 denotes a comb-shaped electrode, reference numeral 6 designates a condensing lens, and reference numeral 7 denotes a recording medium. A collimated laser beam 8 is directed into the light waveguide 2 by the inputting prism light coupler 3, is deflected by an elastic surface wave 9 created by the comb-shaped electrode 5 and emerges from the outputting prism light coupler 4. The emergent light beam 10 forms a spot 13 on the surface of the recording medium 7 by the condensing lens 6. Usually, with respect to the distribution intensity of the emergent light beam 10, the distribution of intensity in direction Y shown in FIG. 1(A) (the direction Y is parallel to a plane defined by the waveguide 2 and is perpendicular to an advancing direction of the emergent light beam 10) does not differ from the distribution of intensity of the input light beam 8, but as shown in FIG. 2 of the accompanying drawings, the distribution of intensity 15 of the emergent light beam 10 as seen from a plane XZ (along a direction Zr perpendicular to a direction Xr which is an advancing direction of the emergent light beam and lying in the plane XZ; also see FIG. 1B) becomes approximate to a distribution in which one side attenuates by an exponential function (the direction Z is parallel to the plane defined by the waveguide 2 and perpendicular to the direction Y and the direction X is perpendicular to the directions Y and Z). FIG. 3(A) of the accompanying drawings shows the distribution of amplitude of the emergent light beam in a case where, for example, LiNbO$_3$ having Ti diffused therein is used as a light wwave-guide and a TiO$_2$ prism light coupler is provided on the light waveguide and He-Ne laser light of a width of 6 mm having a Gaussian distribution is caused to enter the light coupler. In this manner, one of the directions has a Gaussian distribution and the other direction has a one side exponential function distribution.

Now, generally, with regard to a recording light spot formed by a high-density recording optical head, to concentrate the energy density of light and enable high-density recording to be accomplished, the following conditions are required:

(1) that the spot size is very small;
(2) that the peak value of the distribution of intensity of light in the spot is high; and
(3) that the shape of the spot is substantially circular.

However, the distribution of intensity of the spot formed by condensing the emergent light beam by the conventional waveguide optical system whose three-dimensional distribution of amplitude is as shown in FIG. 3(A) by the use of the condensing lens 6 shown in FIG. 1 differs between the Y direction and the Zr direction, as shown in FIG. 3(B) of the accompanying drawings, and the waveguide optical system as shown in FIG. 1(A) suffers from a problem that it does not satisfy the conditions required as the high-density recording light spot.

Such a problem exists irrespective of the deflection of the light beam by a deflecting means, such as a comb-shaped electrode.

SUMMARY OF THE INVENTION

It is an object of the present invention to provide a waveguide optical system in which energy density is high and a substantially circular light spot can be obtained.

The above-object of the present invention is achieved by adjusting, in a waveguide optical system comprising a light waveguide, a light coupler for taking out a light propagated through the light waveguide, and a condensing lens for condensing the light beam emerging from the light coupler into the form of a spot, the coupling length of the light coupler.

The invention will become fully apparent from the following detailed description thereof taken in conjunction with the accompanying drawings.

DESCRIPTION OF THE PREFERRED EMBODIMENTS

Figure 1A:
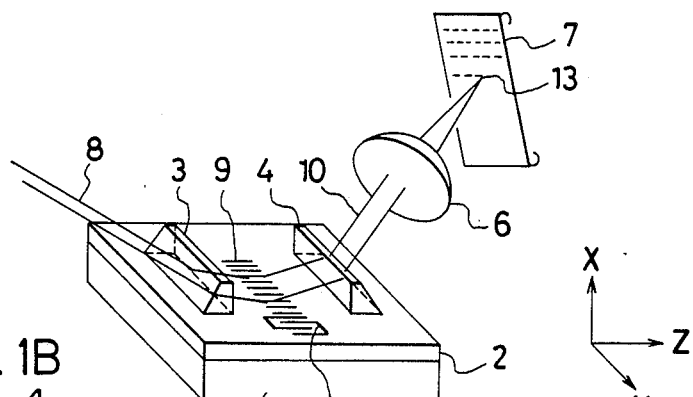
FIG. 1(A) is a perspective view showing an example of the high-density recording optical head using the conventional waveguide optical system.
Figure 1B:
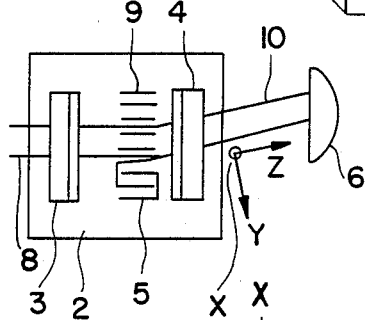
FIG. 1(B) is a top view of FIG. 1(A).
Figure 2:
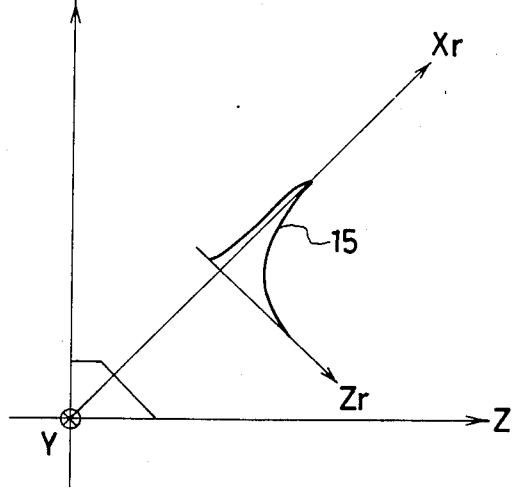
FIG. 2 is a graph showing the distribution of intensity of the emergent light beam in the conventional waveguide optical system.
Figure 3A:
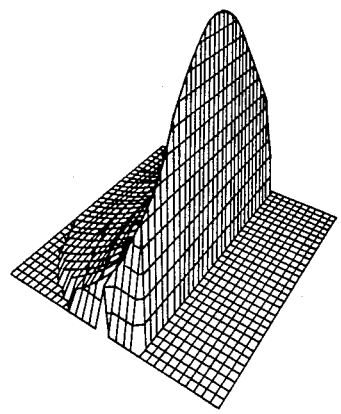
FIGS. 3(A) and (B) show the distribution of amplitude of the emergent light beam by the conventional waveguide optical system and the distribution of intensity of the light spot, respectively.
Figure 3B:
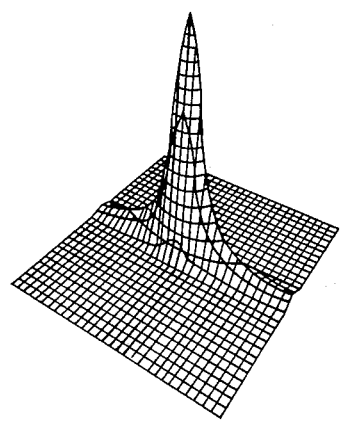
FIG. 3(C) shows the orientations of the meridional and sagittal directions as used herein.
Figure 4:
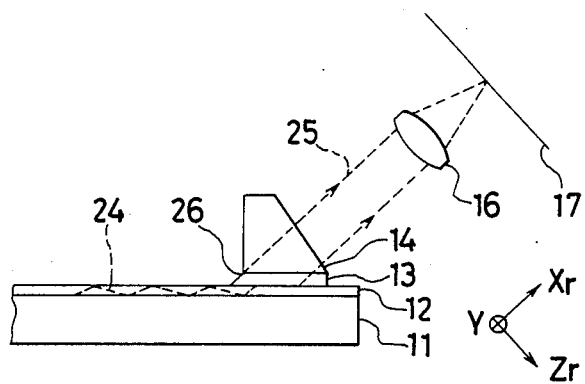
FIG. 4 is a schematic cross-sectional view showing a first embodiment of the present invention.

Referring to FIG. 4 which is a schematic cross-sectional view showing a first embodiment of the present embodiment, reference numeral 11 designates a substrate, reference numeral 12 denotes a thin light waveguide laying in a plane, reference numeral 13 designates an overlayer, reference numeral 14 denotes a prism light coupler, reference numeral 16 designates a condensing lens, and reference numeral 17 denotes a recording medium. In the present embodiment, the overlayer 13, having a refractive index lower than the refractive indices of the light waveguide 12 and the prism light coupler 14, is provided between the prism light coupler 14 and the light waveguide 12. By providing the overlayer 13, the efficient coupling of waveguide light 24 to the prism light coupler 14 decreases and the coupling length thereof is increased. Consequently, the attenuation of the distribution of intensity of an emergent light beam 25 in direction Zr is lower.

In FIG. 4, the emergent light beam 25 advances in the Xr direction of a plane defined by the drawing sheet. Accordingly, the attenuation distances of the distribution of intensity of the emergent light beam in directions Y and Zr become the same as each other in degree and the shape of a spot condensed by the lens 16 becomes approximate to a circle. To obtain a light spot of such a shape approximate to a circle, when the beam width of the waveguide light is 2R and the radius of the pupil of the condensing lens is R, it is desirable that the coupling length be set so that the width of the distribution of intensity of the emergent light beam in the Zr direction is about 2R.

In the construction of the first embodiment in which the advancing direction of the emergent light beam is about parallel to the optical axis of the condensing lens 16, the optimization simulation of the distribution of intensity of the emergent light beam 25 and the position whereat the emergent light beam enters the condensing lens 16 was carried out. In carrying out said simulation, the distribution of amplitude of the emergent light beam in direction Y was of the Gaussian type, the distribution of amplitude of the emergent light beam in direction Zr was a one side exponential function distribution and the distribution of amplitude f of the emergent light beam on the entrance pupil surface of the lens 16 was given by the following equations.

When $Zr \geq \gamma$, $$f = C \exp\left\{ -\frac{\left(\frac{\gamma^2}{R}\right)}{\left(\frac{\alpha}{R^2}\right)} \right\} \exp\left\{ -\frac{\left(\frac{Zr}{R} - \frac{\gamma}{R}\right)}{\frac{\beta}{R}} \right\} \quad (1)$$

When $Zr < \gamma$, $$f = 0 \quad (2)$$

where R is the radius of the entrance pupil of the lens 6, $\alpha$ is a parameter which determines the attenuation width of the Gaussian distribution in direction Y, $\beta$ is a parameter which determines the attenuation of the exponential function in direction Zr, $\gamma$ is a parameter which determines the position whereat the light emerging from the end 26 of a prism shown in FIG. 4 enters the entrance pupil of the condensing lens 16, and C is a normalized constant.

Figure 5:
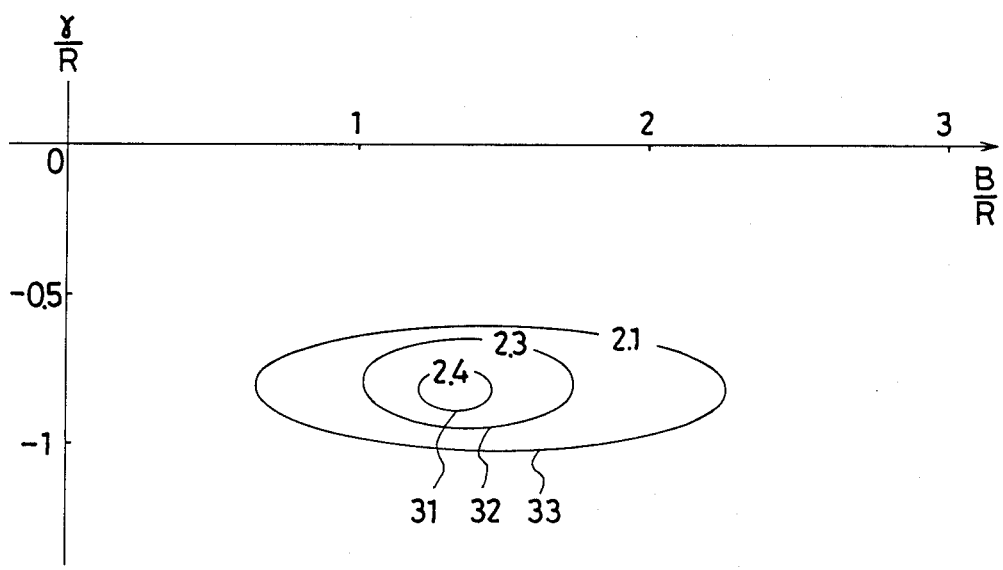
FIG. 5 shows the dependency of the peak value of the light spot in the waveguide optical system of the present invention upon parameters $\beta$ and $\gamma$.

In said simulation, the parameter C was chosen so that the total quantity of light of the light beam emerging from the prism light coupler with the overlayer of the first embodiment was always constant, and the parameters $\beta$ and $\gamma$ were varied and the optimum values of the parameters $\beta$ and $\gamma$ were calculated. FIG. 5 is a graph showing the dependency of the peak value of the spot by the lens 6 upon the parameters $\beta$ and $\gamma$. In FIG. 5, reference numerals 31, 32 and 33 designate contours in which the peak values of the spot are 24, 23 and 21 when the total quantity of light of the waveguide light is 100. It can be seen from FIG. 5 that the peak value of the spot becomes maximum when the parameters $\beta$ and $\gamma$ are in the following ranges:

$$1.2R \leq \beta \leq 1.4R \quad (3)$$

$$-0.9R \leq \gamma \leq -0.7R \quad (4)$$

Figure 6A:
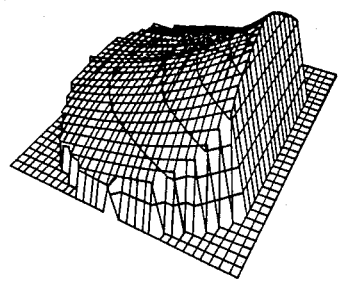
FIGS. 6(A) and (B) show the distribution of amplitude of the emergent light beam by the waveguide optical system of the present invention and the distribution of intensity of the light spot, respectively.
Figure 6B:
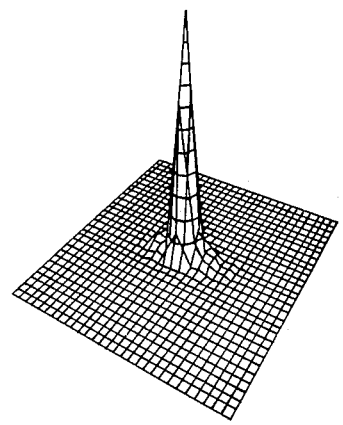

Accordingly, when the light beam width of the waveguide light is 2R and the radius of the pupil of the condensing lens is R and the attenuation distance of the distribution of intensity of the emergent light beam in the Zr direction which decreases exponentially is $\beta$ and Y-axis is taken in a direction parallel to the plane defined by the waveguide 12 and perpendicular to the optical axis of the condensing lens and Zr-axis is taken in a direction perpendicular to the Y-axis and the optical axis and the coordinates in which, of the emergent light beam from the light coupler, the light ray having the maximum intensity enters the entrance pupil of the condensing lens are Zro, Yo, the coupling length of the light coupler and the position of the condensing lens are adjusted so as to satisfy the following two formulas $$-0.9R \leq Zro \leq -0.7R \quad (4)'$$

$$Yo = 0 \quad (4)''$$

and formula (3), whereby a light spot of an optimum distribution of intensity can be obtained. It should be noted that the Y and Zr axes are on the entrance pupil of the condensing lens and the origin of coordinates respecting Zr and Y axes is at a center of the entrance pupil. The distribution of amplitude of the emergent light beam when the parameters $\beta$ and $\gamma$ are in the ranges given by formulas (3) and (4) is shown in FIG. 6(A), and the distribution of intensity of the spot when the emergent light beams is condensed by the lens is shown in FIG. 6(B). As will be seen from FIGS. 6(A) and (B), the distribution of amplitude of the emergent light beam becomes considerably uniform on the entrance pupil of the lens, and the shape of the light spot condensed by the lens is circular and the peak value thereof is high and the size of the spot becomes very small.

It should also be noted that, when the radius of the entrance pupil of the condensing lens is far larger than the width of the emergent light beam, the above condition is not important and instead only the conditions where the width of the emergent light beam in a first direction parallel to the plane defined by said waveguide and perpendicular to an advancing direction of said emergent light beam is generally equal to a width of the distribution of intensity of said emergent light beam in a second direction perpendicular to said first direction and the advancing direction of said emergent light beam are important to achieve the object.

Figure 7:
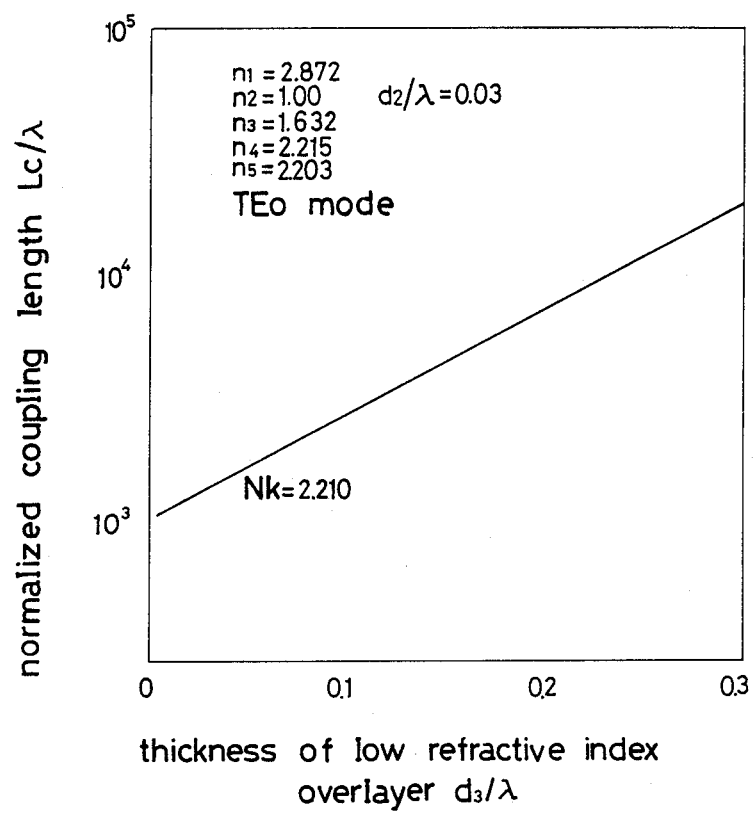
FIG. 7 is a graph showing the relation between the normalized coupling length and the thickness of a low refractive index overlayer in the first embodiment.

Description will now be made of an actual example of the manufacture of a waveguide optical system which satisfies the above-described conditions. LiNbO$_3$ crystal having an excellent piezo-electric property was used as the substrate, and a light waveguide was made by heat-diffusing Ti. Measurement of the waveguide characteristic was effected by the light of a TE mode He-Ne laser (wavelength 6328 Å) relative to the thus made light waveguide and as a result, it has been found that the propagation constant $N_k$ of the TE$_0$ made is 2.210 and the propagation loss is 0.5 dB/cm. Al$_2$O$_3$ (refractive index n=1.632) was used as the overlayer having a refractive index lower than that of the light waveguide, and $Al_2O_3$ was deposited by evaporation to 1200 Å at the location on the light waveguide whereat the prism coupler is provided. There was carried out an experiment in which a $TiO_2$ prism light coupler ($n_1=2.872$) having an angle of inclination of 50° was placed on the overlayer of $Al_2O_3$, the waveguide light was caused to emerge from the light coupler and a spot was formed by a condensing lens. FIG. 7 shows the relation between the normalized coupling length $Lc/2\lambda$ and the thickness of the normalized overlayer $d_3/\lambda$ when $TiO_2$ crystal is used as the prism light coupler and $Al_2O_3$ ($n_3=1.632$) is used as the overlayer and Ti-diffused $LiNbO_3$ crystal ($N_4=2.215$) is used as the light waveguide. The thickness of the $Al_2O_3$ film deposited by evaporation has been calculated by the utilization of the relation of FIG. 7 so as to satisfy the aforementioned formulas (3), (4)' and (4)" when the He-Ne laser light (wavelength $\lambda$: 6328 Å) of a light beam width 6 mm (the width for which intensity is $1/e^2$) is the incident beam.

As a result of the experiment, an optimum light spot was obtained in the thus made waveguide optical system substantially in accordance with the above-mentioned theoretical value.

In the above-described embodiment, the field distribution of the light waveguide, i.e., the distribution of intensity of the waveguide light in the direction of depth, exists near the surface of the light waveguide and therefore, an example in which the coupling length is adjusted by the overlayer having a refractive index lower than that of the light waveguide for the purpose of increasing the coupling length of the prism coupler has been shown. Where the field distribution exists in a portion deep from the surface of the light waveguide as in the light waveguide formed by extraneously diffusing the Li of the $LiNbO_3$, for example, conversely to the above-described embodiment, it is necessary to strengthen the coupling of the prism coupler and decrease the coupling length thereof, and it would also come to mind to use a thin film having a refractive index higher than the refractive index of the light waveguide to adjust the coupling length.

Also, in the present embodiment, the thickness of the overlayer need not always be constant, but can be varied in a tapered form, for example, in the direction of propagation of the waveguide light to thereby obtain a desired coupling length.

Figure 8:
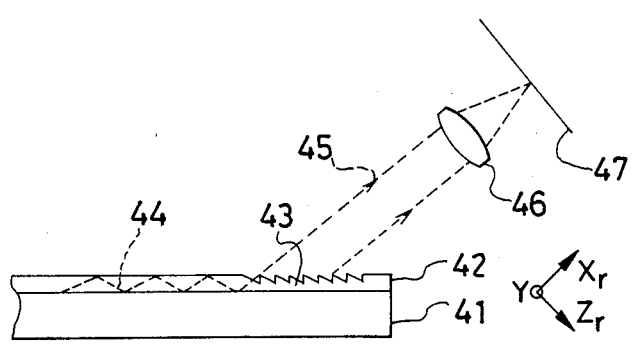
FIG. 8 is a schematic cross-sectional view showing a second embodiment of the present invention.

Reference is now made to FIG. 8 to describe a second embodiment of the present invention. In FIG. 8, reference numeral 41 designates a substrate, reference numeral 42 denotes a light waveguide, reference numeral 46 designates a condensing lens, reference numeral 47 denotes a recording medium, reference numeral 44 designates a waveguide light, reference numeral 45 denotes an emergent light beam, and reference numeral 43 designates a grating light coupler. In the second embodiment, the prism light coupler used in the first embodiment is replaced with a grating light coupler.

The grating light coupler can be made at light accuracy by the utilization of one of various well-known techniques such as the holographic technique utilizing the interference between two light beams and the electron beam exposure technique. The procedure of making a grating by utilizing the holographic technique will hereinafter be described briefly. By spin coating, photoresist was applied to a film thickness of 0.4 μm on a Ti-diffused $LiNbO_3$ waveguide made by a method similar to the above-described first embodiment. The resist was formed by exposing a grating pattern to light by the interference between two light beams of an $Ar^+$ laser, thereafter subjecting it to a developing treatment and forming a rugged grating pattern. By etching the surface of the waveguide by an ion beam with the resist pattern as a mask, a grating coupler was formed.

The amplitude of the ruggedness of the grating light coupler was adjusted in the range of several thousand Å so that the distribution width of intensity of the emergent light beam 45 from the grating light coupler 47 in the Zr direction satisfies the optimum conditions as in the first embodiment. That is, by making the coupling length of the grating light coupler equal to the optimum coupling length obtained by a calculation on the basis of formulas (3), (4)' and (4)", there was formed a waveguide optical system in which a minimum spot diameter and the peak value of a maximum intensity of light could be obtained.

The degree of modulation of the grating light coupler is not restricted to a case where it is uniform, but may be formed so as to be gradually varied in the direction of propagation of the waveguide light to thereby obtain a desired coupling length.

The grating light coupler shown in the second embodiment is more excellent in stability and can be made at a lower cost than the prism light coupler of the first embodiment.

The present invention is not restricted to the above-described embodiments, but various modifications thereof are possible. Also, the waveguide light in the above-described embodiments may be a deflected light or a modulated light as already described with respect to the prior art and is restricted in no way.

What we claim is:

1. A waveguide optical system comprising a thin light waveguide extending in a plane, a light coupler for receiving a light beam propagated through said light waveguide and directing the light beam to a condensing lens, said condensing lens condensing the light beam emerging from said light coupler into a substantially circular spot, such that said waveguide optical system satisfies the following conditions:

$$1.2R \leq \beta \leq 1.4R$$

$$-0.9R \leq Zro \leq -0.7R$$

$$Yo = 0$$

where the width of said emergent light beam in a first direction parallel to the plane defined by said waveguide and perpendicular to an advancing direction of said emergent light beam is $2R$, the radius of the pupil of said condensing lens is $R$, the attenuation distance of the distribution of intensity which decreases exponentially in a second direction perpendicular to said first direction and the advancing direction, of said emergent light beam is $\beta$, wherein the Y-axis is taken in a third direction parallel to said plane and perpendicular to the optical axis of said condensing lens, the Zr-axis is taken in a fourth direction perpendicular to said third direction and the optical axis of said condensing lens, the coordinates respecting Zr- and Y-axes of said emergent light beam for a light ray having the maximum intensity which enters the entrance pupil of said condensing lens are Zro, Yo, the origin of the coordinates respecting Zr- and Y-axes is at a center of said entrance pupil and the optical axis of said condensing lens is about parallel to said advancing direction.

2. A waveguide optical system according to claim 1, wherein said light coupler is a prism light coupler, and an overlayer having a refractive index lower than that of said light waveguide is provided between said prism light coupler and said light waveguide.

3. A waveguide optical system according to claim 2, wherein the film thickness of said overlayer tapers in the direction of propagation of said waveguide light beam.

4. A waveguide optical system according to claim 1, wherein said light coupler is a grating light coupler.

5. A waveguide optical system according to claim 4, wherein the degree of modulation of said grating light coupler varies in the direction of propagation of said waveguide light beam.

* * * * *

UNITED STATES PATENT AND TRADEMARK OFFICE
CERTIFICATE OF CORRECTION

PATENT NO. : 4,832,428
DATED : May 23, 1989
INVENTOR(S) : MAMORU MIYAWAKI ET AL.  Page 1 of 2

It is certified that error appears in the above-identified patent and that said Letters Patent is hereby corrected as shown below:

On the title page:

AT [63]

Insert --[63] RELATED U.S. APPLICATION DATA
   This application is a continuation-in-part of application Serial No. 642,761 filed 8/21/84, now abandoned.--

COLUMN 1

Line 50, "wwave-" should read --wave- --.

COLUMN 2

Lines 41-42, delete lines 41 and 42.
   Line 62, "embodiment," should read --invention,--.
   Line 64, "laying" should read --lying--.

COLUMN 3

Line 40, "$\frac{y^2}{R}$" should read --$\frac{Y^2}{R}$--.
   Line 49, "lens 6," should read --lens 16,--.
   Line 65, "lens 6" should read --lens 16--.

COLUMN 4

Line 37, "beams" should read --beam--.

UNITED STATES PATENT AND TRADEMARK OFFICE
CERTIFICATE OF CORRECTION

PATENT NO. : 4,832,428
DATED : May 23, 1989
INVENTOR(S) : MAMORU MIYAWAKI ET AL.

It is certified that error appears in the above-identified patent and that said Letters Patent is hereby corrected as shown below:

COLUMN 5

Line 15, "($N_4=2.215$)" should read --($n_4=2.215$)--.

Signed and Sealed this

Third Day of July, 1990

Attest:

HARRY F. MANBECK, JR.

Attesting Officer

Commissioner of Patents and Trademarks